US011427200B2

(12) United States Patent
Gillet

(10) Patent No.: US 11,427,200 B2
(45) Date of Patent: Aug. 30, 2022

(54) AUTOMATED DRIVING SYSTEM AND METHOD OF AUTONOMOUSLY DRIVING A VEHICLE

(71) Applicant: TOYOTA MOTOR EUROPE, Brussels (BE)

(72) Inventor: Christophe Gillet, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 34 days.

(21) Appl. No.: 16/968,747

(22) PCT Filed: Feb. 28, 2018

(86) PCT No.: PCT/EP2018/054951
§ 371 (c)(1),
(2) Date: Aug. 10, 2020

(87) PCT Pub. No.: WO2019/166084
PCT Pub. Date: Sep. 6, 2019

(65) Prior Publication Data
US 2021/0016779 A1    Jan. 21, 2021

(51) Int. Cl.
*B60W 30/18*    (2012.01)
*B60W 40/04*    (2006.01)
*B60W 50/08*    (2020.01)

(52) U.S. Cl.
CPC ...... *B60W 30/18163* (2013.01); *B60W 40/04* (2013.01); *B60W 50/085* (2013.01);
(Continued)

(58) Field of Classification Search
CPC ............ B60W 30/18163; B60W 40/04; B60W 50/085; B60W 2420/52; B60W 2552/53;
(Continued)

(56) References Cited

U.S. PATENT DOCUMENTS

| 2015/0367854 A1* | 12/2015 | Ezoe | ............... B60W 30/18163 701/1 |
| 2015/0375748 A1 | 12/2015 | Nagase et al. | |

(Continued)

FOREIGN PATENT DOCUMENTS

| DE | 10 2015 200 765 A1 | 7/2016 | |
| DE | 102015200765 A1 * | 7/2016 | ............ B60W 40/04 |

(Continued)

OTHER PUBLICATIONS

English Translation_JP2003063273A (Year: 2003).*
English Translation_DE102015200765A1 (Year: 2015).*
(Continued)

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

An automated driving system and method of autonomously driving a vehicle. The system includes for a vehicle including at least one sensor device configured to detect the vehicle position and sense environment characteristics of the vehicle, an electronic control device configured to control autonomous driving of the vehicle based on an output of the sensor device, in which the controlling of autonomous driving includes an autonomous overtaking functionality for overtaking by changing the lane, and disable the autonomous overtaking functionality, in case at least one of a set of predetermined overtaking conditions is not satisfied.

18 Claims, 5 Drawing Sheets

(52) U.S. Cl.
CPC ..... *B60W 2420/52* (2013.01); *B60W 2552/53* (2020.02); *B60W 2554/404* (2020.02); *B60W 2554/406* (2020.02); *B60W 2556/45* (2020.02)

(58) Field of Classification Search
CPC ..... B60W 2554/404; B60W 2554/406; B60W 2556/45; B60W 2050/0026; B60W 2050/0028; B60W 2420/42; B60W 2520/10; B60W 2554/00; B60W 2554/801; B60W 2555/60; B60W 2556/50; B60W 2556/65
See application file for complete search history.

(56) References Cited

U.S. PATENT DOCUMENTS

| | | |
|---|---|---|
| 2016/0272204 A1 | 9/2016 | Takahashi et al. |
| 2018/0043897 A1 | 2/2018 | Hashimoto et al. |

FOREIGN PATENT DOCUMENTS

| | | | |
|---|---|---|---|
| DE | 10 2015 219 578 A1 | | 4/2017 |
| JP | 2003-63273 A | | 3/2003 |
| JP | 2003063273 A | * | 3/2003 |
| JP | 2016004445 A | * | 1/2016 |

OTHER PUBLICATIONS

English Translation_JP2016004445A (Year: 2016).*
International search report for PCT/EP2018/054951 dated Nov. 6, 2018.

* cited by examiner

Legend:
- Input Signal (hexagon)
- Logic condition (diamond)
- State (oval)
- Function (rectangle)
- OR-logical (⊕)
- AND-logical (D)

AUTOMATED DRIVING SYSTEM AND METHOD OF AUTONOMOUSLY DRIVING A VEHICLE

CROSS-REFERENCE TO RELATED APPLICATIONS

This application is a National Stage of International Application No. PCT/EP2018/054951 filed on Feb. 28, 2018.

FIELD OF THE DISCLOSURE

The present disclosure is related to a system and a method for autonomously driving a vehicle, in particular for enabling and disabling an autonomous overtaking functionality.

BACKGROUND OF THE DISCLOSURE

An automated driving system is a motor vehicle driving automation system that is capable of performing part or all of the dynamic driving task (DDT) on a sustained basis. An automated driving system may be mounted or is to be mounted in a vehicle (such as a car, a truck, an airplane).

In the case of road vehicles in particular, it may range in level from no driving automation (level 0) to full driving automation (level 5) according to SAE norm J3016.

In order to realize this function, an automated driving system normally comprises at least one sensor, an electronic control unit, and feedback devices which transmit information to the driver and/or act on control member(s) of the vehicle (for instance the steering shaft, the brake, the accelerator pedal or the like) instead of the driver to take some driving load off the driver.

An automated driving system is at least capable of assuming part of the driving task (for instance, to perform longitudinal control of the vehicle). In particular, many automated driving systems are designed to assist the driver and are therefore called Advanced Driver Assistance Systems (ADAS). Some automated driving systems are capable of assuming the whole driving task, at least during some periods. Such systems are classified at level 3, 4 or 5 according to SAE norm J3016.

The present disclosure concerns an automated driving system classified desirably at level 3 or more according to SAE norm J3016.

During the periods when the automated driving system is activated, in many cases the driver may perform to some extent non-driving-related tasks such as using his/her smartphone, texting, etc., but he or she still remains in the obligation to be able to safely take over at any moment.

However, at such system the driver can still see or perceive the autonomous driving of the vehicle.

An automated driving system can be capable of performing autonomously an overtaking action, for example of another, e.g. slower vehicle in front. However, there is the risk that the driver or a passenger of the vehicle perceives such an overtaking action as stressful or even as angst-inducing.

For example, JP2009248892 (A) describes a travel control system for automatically passing a preceding vehicle. This travel control system controlling travel speed of the own vehicle to keep an inter-vehicle distance between the own vehicle and the preceding vehicle at a prescribed distance has: a means for deciding whether or not it is proper for the own vehicle to pass the preceding vehicle based on traveling states of the own vehicle and the preceding vehicle; a passing preparation operation execution means executing an operation for preparing the passing when deciding that it is proper for the vehicle to pass the preceding vehicle; a passing decision means deciding whether the own vehicle can pass the preceding vehicle based on traveling environment and the traveling states of the own vehicle and the preceding vehicle; and a passing means executing the passing when deciding that the preceding vehicle P can be passed.

JP 2003 063273 (A) discloses a vehicle running controller for automatically performing passing operation. When a speed of a preceding vehicle running ahead is lower than a set speed of an own vehicle during control running between automobiles, whether the own vehicle can pass the preceding vehicle or not is judged based on a running position of the own vehicle and traffic information by a passing judging means to perform the operation for passing the preceding vehicle by automatic steering.

However, there may still occur frightening situations for a vehicle passenger during an overtaking action. For example, in case the automated driving system has already started an overtaking action and the vehicle is hindered to get back in its original lane, in order to complete the overtaking action, the passenger may perceive a stressful or even frightening driving scenario.

SUMMARY OF THE DISCLOSURE

Currently, it remains desirable to provide an automated driving system and method which is able to avoid autonomous overtakings which are perceived as stressful or even frightening for the driver.

Therefore, according to the embodiments of the present disclosure, it is provided an automated driving system for a vehicle. The system comprises at least one sensor device configured to detect the vehicle position and sense environment characteristics of the vehicle. The system further comprises an electronic control device configured to:
 control autonomous driving of the vehicle based on an output of the sensor device, wherein said controlling of autonomous driving includes an autonomous overtaking functionality for overtaking by changing the lane,
 disable the autonomous overtaking functionality, in case at least one of a set of predetermined overtaking conditions is not satisfied.

Accordingly, the automated driving system disables the autonomous overtaking functionality, as long as not all predetermined overtaking conditions are satisfied.

The overtaking functionality is desirably configured to control overtaking another vehicle or object in front of the autonomously driven (host) vehicle.

Disabling the autonomous overtaking functionality (i.e. automated overtaking function) desirably means that an overtaking action is prohibited. In other words, the automated driving system desirably by default does not allow overtaking. Only in case each of the predetermined overtaking conditions has been checked by the automated driving system, the autonomous overtaking functionality is desirably enabled.

In this way it is in particular possible to avoid situations in which an overtaking action creates stress at a passenger during the overtaking, in particular after the vehicle has already overtaken another vehicle and is hindered from getting back to its original lane.

The set of predetermined overtaking conditions may comprise at least one of: a condition, where a current lane on which the vehicle moves and/or a parallel overtaking lane has a traffic density not exceeding a predetermined traffic density threshold, a condition, where an estimated probability of a safe lane return from the overtaking lane to the current lane for completing the overtaking is equal to or higher than a predetermined safe lane return threshold, and a condition, where an estimated distance required for safe overtaking on the overtaking lane does not exceed an estimated distance available for the overtaking.

The probability of the safe lane return may be determined based on a predetermined look-up table and/or a predetermined mathematical model representing an average traffic at the position of the vehicle.

The electronic control device (1) may be configured to determine the traffic density (i.e. environment characteristics) based on at least one of external traffic information (V2X) and sensor output of a predetermined time period.

Accordingly, the electronic control device may be configured to estimate the probability of a safe lane return based on a traffic flow estimation, wherein the traffic flow estimation may be determined based on at least one of a (e.g. averaged) radar sensor output of the sensor device, external traffic information (e.g. V2X), and an (e.g. averaged) output of an object classification functionality for identifying external objects.

Determining the traffic density may include determining a vehicle mean distance between other vehicles on the lane driven by the vehicle in a predetermined range around the vehicle.

The look-up table may comprise predetermined information about a safe lane return probability as a function of the traffic density and/or the vehicle mean distance.

Accordingly, said predetermined information may be empirical data which have been acquired by training a test system. Such a test system may e.g. log driving data of test drivers.

The probability of the safe lane return may be determined by looking up in the look-up table the safe lane probability matching to the determined traffic density and/or the vehicle mean distance.

The electronic control device may be configured to determine the distance required for safe overtaking as a function of at least one of a relative speed of the vehicle with respect to another vehicle in front to be overtaken, the estimated probability of a safe lane return and/or the estimated distance required for a safe lane return, the distance between the vehicle and the other vehicle, and a predetermined speed-dependent safety distance.

The distance required for safe overtaking is desirably an available overtaking range on the overtaking lane. Said overtaking lane is e.g. a parallel lane left to the lane driven by the vehicle.

By determining the distance required for safe overtaking the system can desirably anticipate how much space is needed for safely overtaking another vehicle, in particular without frightening a vehicle passenger.

The predetermined speed-dependent safety distance may be determined as a function of the vehicle speed and a predetermined time constant.

The distance required for safe overtaking may be further determined as a function of a safe lane return distance required for a safe lane return. Said safe lane return distance may be determined as a function of the probability of a safe lane return.

In other words the distance required for safe overtaking may also be determined as a function of the safe lane return distance instead of the probability of a safe lane return.

The safe lane return distance desirably increases when the probability of a safe lane return decreases.

The electronic control device may be configured to estimate the distance available for the overtaking as the distance between the vehicle and a detected overtaking lane end.

The vehicle may be autonomously driven toward the detected overtaking lane end.

Accordingly, the distance available for the overtaking desirably is a passage on the overtaking lane which can be used by the vehicle to carry out the overtaking action.

The length (i.e. distance) of this available passage is compared to the distance required for safe overtaking. In case it is equal or longer than the distance required for safe overtaking, the autonomous overtaking functionality is desirably enabled.

In this context it is also notable that the distance required for safe overtaking is determined also as a function of the safe lane return distance and/or the probability of a safe lane return.

Hence, in case the condition is fulfilled where an estimated distance required for safe overtaking on the overtaking lane does not exceed an estimated distance available for the overtaking, it is also implied that an estimated probability of a safe lane return from the overtaking lane to the current lane for completing the overtaking is equal to or higher than a predetermined safe lane return threshold. Furthermore it may be additionally implied in this case that a current lane on which the vehicle moves and/or a parallel overtaking lane has a traffic density not exceeding a predetermined traffic density threshold. Furthermore it may be additionally implied in this case that the vehicle is autonomously driven toward an overtaking lane end which is beyond a predetermined distance.

The overtaking lane end may be any type of element terminating or blocking the overtaking lane. For example, it may include a lane merging area and/or an exit lane.

A lane merging area desirably comprises at least two merging lanes which include the overtaking lane.

The electronic control device may be configured to detect the overtaking lane end based on at least one of a detected road sign, and/or the vehicle position in combination with map information.

In case the vehicle is autonomously driven toward an overtaking lane end, the set of predetermined overtaking conditions may further comprise a condition, where said overtaking lane end is beyond a predetermined distance.

Accordingly, the automated driving system desirably determines whether there is an overtaking lane end within a predetermined distance. If not, said condition is satisfied.

The electronic control device may comprise an object classification functionality for detecting and classifying external objects including other vehicles and road signs.

The object classification may be based on at least one of a camera sensor output of the sensor device, a radar sensor output of the sensor device, and a LIDAR sensor output of the sensor device.

Accordingly, the sensor device may comprise at least one of a radar sensor, a camera sensor, a LIDAR sensor, and a radio navigation sensor. Hence, said sensor device is desirably configured to sense environment characteristics, i.e. the driving scene of the vehicle, and/or the vehicle position (e.g. with regard to the road and/or other objects by a radar sensor, a camera sensor, a LIDAR sensor, and/or the global positioning by a radio navigation sensor, e.g. a GPS sensor).

The system may further comprise a radio (or wireless communication) interface for receiving data comprising at least one of external traffic information (V2X) and map data.

Accordingly, the environment characteristics may also comprise said external traffic information (V2X) and/or map data.

The present disclosure further relates to a method of autonomously driving a vehicle having an automated driving system, the method comprising the steps of:
- detecting the vehicle position,
- sensing (physical) characteristics of the environment of the vehicle,
- controlling autonomous driving of the vehicle based on an output of the sensor device, wherein said controlling of autonomous driving includes an overtaking functionality for overtaking by changing the lane, and
- disabling the overtaking functionality, in case at least one of a set of predetermined overtaking conditions is not satisfied.

The method may comprise further method steps which correspond to the functions of the system, as described above.

The present disclosure further relates to a computer program comprising instructions for executing the steps of the method, when the program is executed by a computer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
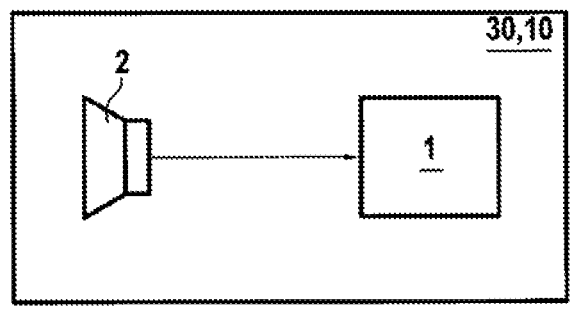
FIG. 1 shows a schematic block diagram of a system according to embodiments of the present disclosure.

FIG. 1 shows a block diagram of a system 30 according to embodiments of the present disclosure. The system may be integrated in a vehicle 10. The system 30 includes an electronic control device 1.

The electronic control device 1 may comprise an electronic circuit, a processor (shared, dedicated, or group), a combinational logic circuit, a memory that executes one or more software programs, and/or other suitable components that provide the described functionality. In other words, system 30 may be a computer device.

The electronic control device 1 may further be connected to a memory, which may store data, e.g. a computer program which when executed, carries out the method according to the present disclosure. Further, the system or the memory may store map data.

The system 30 has desirably a radio interface and/or wireless communication interface. Over said interface the system may receive external traffic information (e.g. V2X) and/or map data.

The system 30 has further an input for receiving data (sensor output) of a sensor device 2. Said sensor device may comprise at least one of a radar sensor, a camera sensor, a LIDAR sensor, and a radio navigation sensor.

The system may be configured to identify objects in the images received from the sensor device 2, e.g. by carrying out a computer vision algorithm for detecting the presence and location of objects (i.e. a vehicle in front) in a sensed scene. For example, persons, vehicles and other objects may be detected. The system may track the detected objects across the images.

The system is configured to autonomously drive the vehicle. The system needs to ensure that the vehicle can navigate with a minimum intervention from driver. For this reason the automated driving should be such that stressful or frightening driving situations are avoided as far as possible. Therefore it is required in some case to prohibit automatic overtaking to mitigate risk, in case the determined road profile is not appropriate for a safe overtaking.

Figures 2A, 2B:
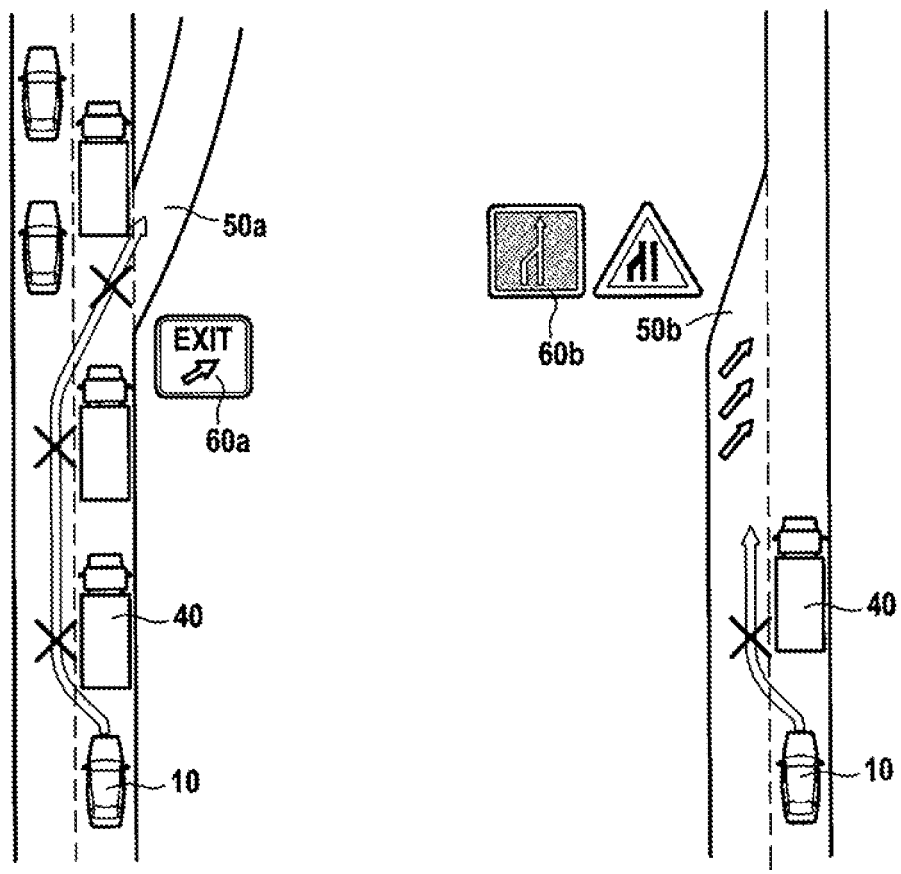
FIGS. 2a and 2b show two different schematic scenarios of an overtaking lane end.

FIGS. 2a and 2b show two different schematic scenarios of an intended overtaking of a vehicle 10 with an automated driving system, what is however difficult due to an overtaking lane end 50a, 50b. In FIG. 2a the overtaking lane end is defined by an exit lane which the system has scheduled to take. In FIG. 2b the overtaking lane is defined by a lane merging area where the overtaking lane merges with the lane next to it. FIG. 2a additionally demonstrates that the traffic density, in particular on the lane of the vehicle 10, is a relevant aspect for a safe overtaking. The lane ends may be detected by detecting corresponding traffic signs 60a, 60b.

This aspect is considered by the present disclosure by desirably determining a probability of a safe lane return, as it will be explained in more detail in the following. In the exemplary scenario of FIG. 2A the dense traffic on the lane of the vehicle additionally hinders the vehicle when overtaking from returning on its initial lane and taking the scheduled exit.

The overtaking lane end limits the distance available for overtaking. It is accordingly desirable that the system 30 is configured to estimate (and hence anticipates) the overtaking lane end. By doing so, it can be determined by the system whether an overtaking is possible or whether the autonomous overtaking functionality is to be disabled.

Figure 3:
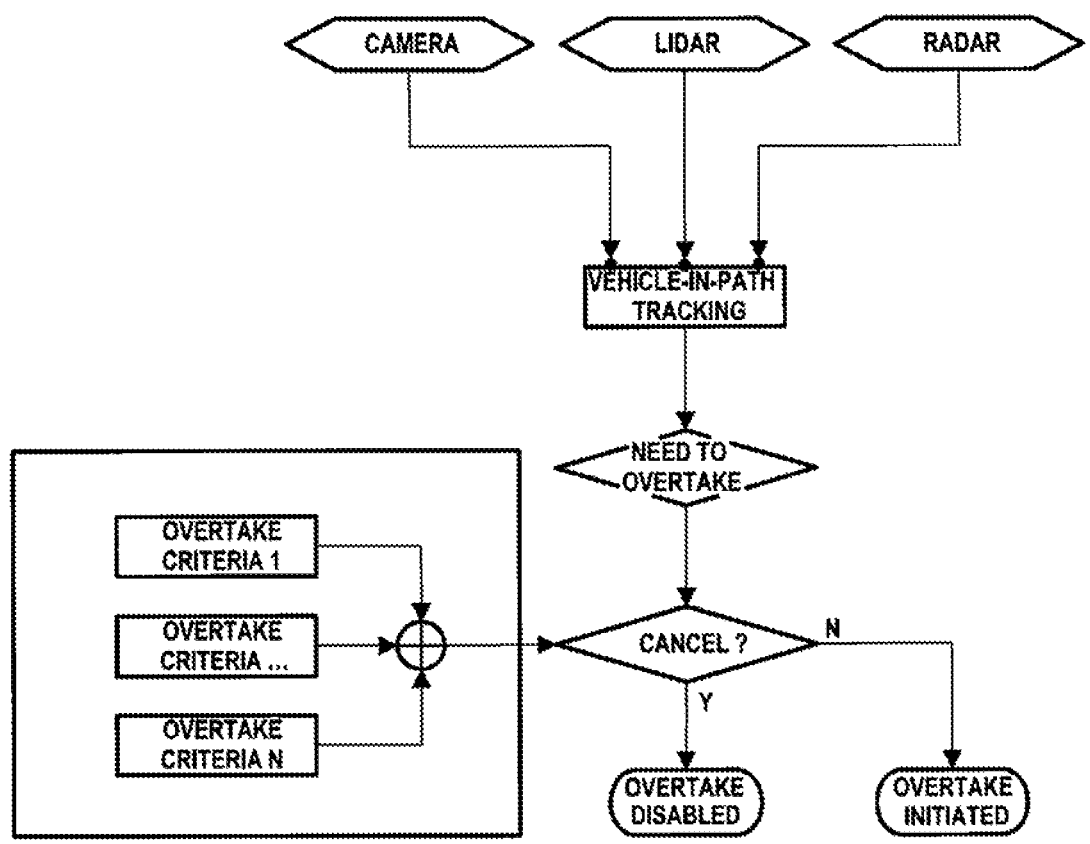
FIG. 3 shows a schematic representation of a basic logic (flow chart) of the method according to embodiments of the present disclosure.

FIG. 3 shows a schematic representation of a basic logic (flow chart) of the method according to embodiments of the present disclosure.

According to said logic, sensor output is used to control a vehicle in-path tracking, in other words, to autonomously drive the vehicle on the road, desirably toward a destination selected by a vehicle passenger.

Due to an autonomous overtaking functionality the system is configured to determine whether an overtaking becomes necessary, e.g. due to a slower vehicle in front. This may in particular apply to situations where the vehicle is autonomously driven on a road having several lanes, e.g. a high way.

However, before carrying out an overtaking, it is determined whether each of a set of predetermined overtake criteria 1 to N (overtaking conditions) is fulfilled. The checking of these criteria is further explained in context of FIG. 4.

In case at least one of a set of predetermined overtaking criteria is not satisfied, the autonomous overtaking functionality is disabled. Otherwise, the overtaking is initiated.

Figure 4:
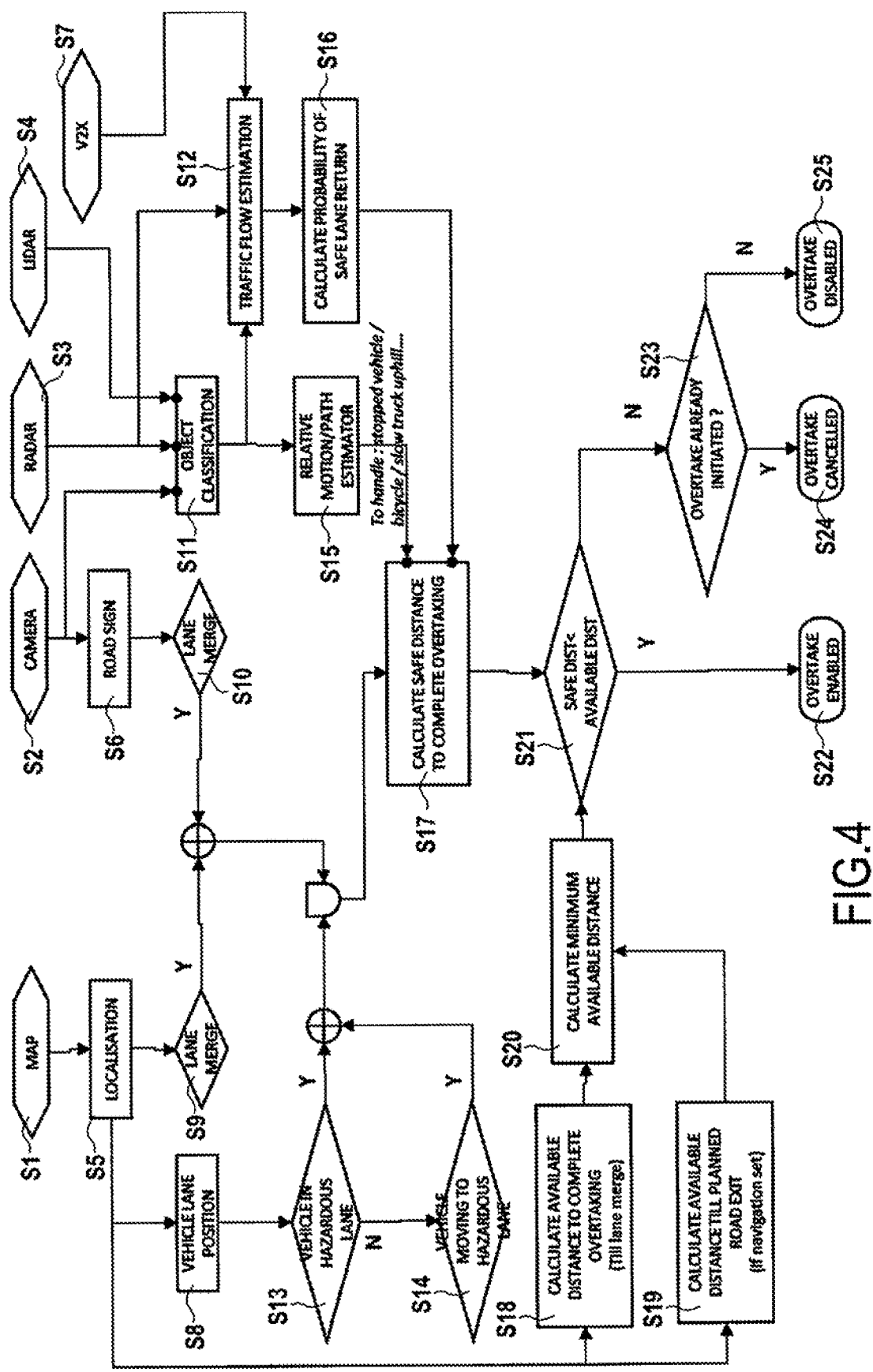
FIG. 4 shows a schematic representation of an overtaking disabling logic (flow chart) according to embodiments of the present disclosure.

FIG. 4 shows a schematic representation of an overtaking enabling/disabling logic (flow chart) according to embodiments of the present disclosure. Accordingly, FIG. 4 is focusing on a cancellation logic. The flow chart of FIG. 4 may be run cyclically (eg. every 60 ms).

In steps S9 and S10 a lane merging area or another overtaking lane end as e.g. an exit lane is determined based on at least one of a detected road sign (step S6, e.g. detected by analyzing a camera output, step S2), and the determined vehicle position (step S5) in combination with map information (step S1). A lane merging area comprises desirably at least two merging lanes, wherein detecting a lane merging area desirably comprises detecting whether the vehicle is moving on one of the at least two lanes. In order to detect lane merging areas, high definition maps or surrounding sensors (imaging sensors, . . . ) may be used, the next lane closing is desirably continuously monitored, and its presence/distance may be reported to the system.

The vehicle position (step S5) may be determined using high definition maps, and potentially other surround sensor (imaging, radar, . . . ) or a fusion result, vehicle lane position may also be assessed.

In step S20 the distance available for the overtaking is determined as a function of at least one of an available distance until a detected lane merging area on the scheduled path (step S18), and an available distance until a detected exit lane on the scheduled path (step S19) (in case a navigation destination is set).

In step S11 an object classification is carried out based on at least one of a camera sensor output of the sensor device (step S2), a radar sensor output of the sensor device (step S3), and a LIDAR sensor output of the sensor device (step S4). Accordingly, the electronic control device desirably comprises an object classification functionality for detecting and classifying external objects including other vehicles and road signs. For example, based on surround sensors, vehicles in current lane are detected and tracked. Object type (vehicle/truck/motorcycle) as well as relevant information such as range, relative speed may be determined. For example, based on surround sensor (lane change radar, imaging sensor, LIDAR, etc.), the traffic flow of own and surround lane is estimated (using averaged inter-vehicle distance over specific time). Map and cloud data may also be used to assess the traffic flow.

In step S12 the traffic flow estimation (or the traffic density) is determined based on at least one of external traffic information (V2X) (step S7), a radar sensor output (step S3), and classified external objects (step S11), as e.g. other vehicle. In other words, the traffic flow estimation is desirably determined based on at least one of a radar sensor output of the sensor device, external traffic information (V2X), and an output of an object classification functionality for identifying external objects.

In step S16 the probability of a safe lane return is estimated (i.e. an estimation thereof is calculated) based on the traffic flow estimation (step S12). In other words, a probability related to the easiness to insert the vehicle back in its originating lane after overtaking is estimated, e.g. based on own and overtaking lane flow. This estimation is desirably based on a long-term averaged information (e.g. sensor output acquired over a predetermined time), e.g. over several minutes, e.g. 5 to 10 minutes.

In step S17 the required safe distance to complete overtaking (estimated distance required for safe overtaking) is calculated as a function of at least one of the vehicle relative motion of the vehicle (a relative speed of the vehicle with respect to another vehicle in front to be overtaken) (step S15), the scheduled path, the relative motion of external objects (step S15), the estimated probability of a safe lane return (step S16), and a detected lane merging area (step S9, S10) and/or hazardous lane (step S13, S14).

Accordingly, the required safe distance to complete overtaking may further be determined as a function of the condition whether the vehicle is on a hazardous lane (i.e. a lane ending in a predetermined distance, e.g. due to lane merging) (step S13) or is moving to a hazardous lane (i.e. a lane ending in a predetermined distance, e.g. due to lane merging or scheduled exit of the current road) (step S14). For example, following overtaking maneuver, the vehicle will enter the hazardous lane. It is advantageous that the lane position is determined beforehand (step S8), before steps S13, S14.

In step S21 it is determined whether the estimated distance required for safe overtaking on the overtaking lane exceeds an estimated distance available for the overtaking.

If it does not exceed, the autonomous overtaking functionality is enabled and/or overtaking is initiated in step S22.

If it exceeds, it may further be checked whether an overtaking has already been initiated (step S23). If yes, the overtaking action is canceled (step S24), if not the autonomous overtaking functionality is disabled (step S25). In case of a cancellation, the vehicle may be automatically be decelerated, in order to return back to its original position on the initial lane behind the vehicle which was intended to be overtaken.

Figure 5:
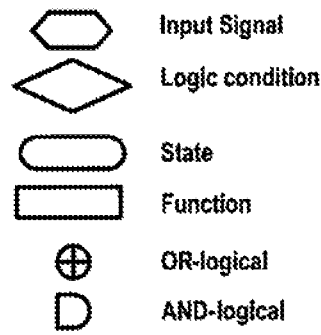
FIG. 5 shows a legend of the flow charts of FIGS. 3 and 4.

FIG. 5 shows a legend of the flow charts of FIGS. 3 and 4.

Figure 6A:
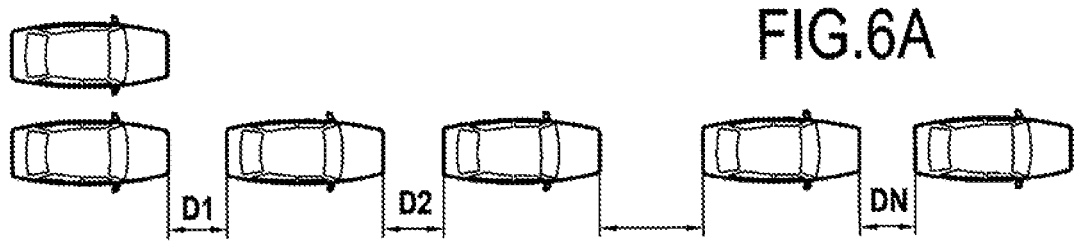
FIGS. 6a and 6b show two different schematic scenarios of traffic density and the related vehicle mean distance.
Figure 6B:
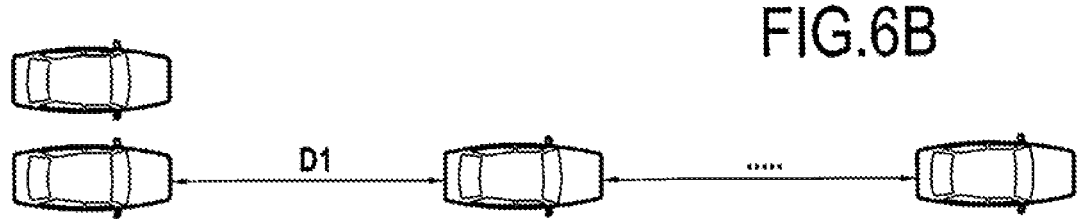

FIGS. 6a and 6b 2b show two different schematic scenarios of traffic density and the related vehicle mean distance.

In the example of FIG. 6a a relatively high traffic density is schematically shown. In other words, it is an example for relatively low probability of safe lane return. The vehicle mean distance can be calculated as:

$$\overline{D_{short}} = \sum_{i=1}^{N} \frac{D_i}{N}$$

wherein $D_i$ is the distance between two subsequent vehicles and N is the number of vehicles considered for the calculation.

In the example of FIG. 6b a relatively low traffic density is schematically shown. In other words, it is an example for relatively high probability of safe lane return. The vehicle mean distance can be calculated as:

$$\overline{D_{long}} = \sum_{i=1}^{N} \frac{D_i}{N}$$

wherein $D_i$ is the distance between two subsequent vehicles and N is the number of vehicles considered for the calculation.

Figure 7:
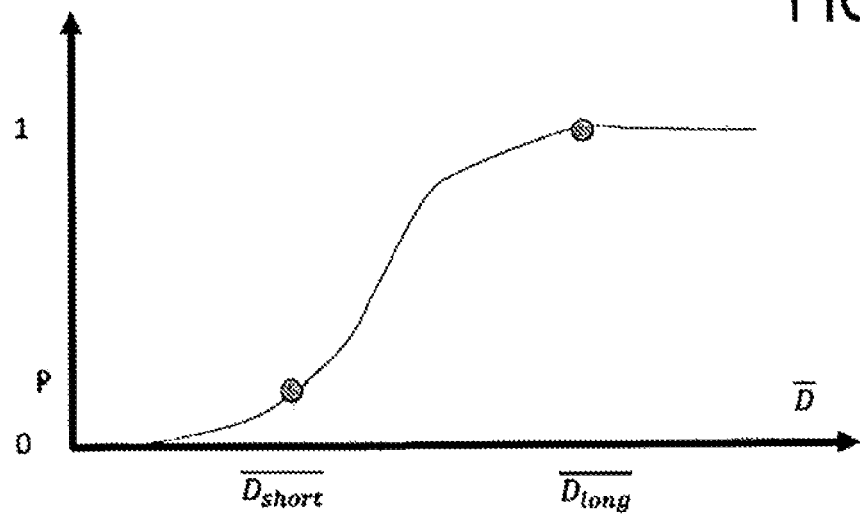
FIG. 7 shows a schematic representation of a diagram expressing the relationship between the vehicle mean distance and the probability of a safe lane return according to embodiments of the present disclosure.

FIG. 7 shows a schematic representation of a diagram expressing the relationship between the vehicle mean distance and the probability of a safe lane return according to embodiments of the present disclosure. In other words, the diagram shows the relationship between the traffic density and a probability related to the easiness to insert vehicle back in its originating lane after overtaking is estimated based on own and overtaking lane flow. In the Y-axis of the diagram, P is the probability of a safe lane return, with 0 indicating that no lane change possible, and 1 that a lane change is possible and safe.

P may be determined by using a predetermined look-up table which maps the (detected) vehicle mean distance to a probability of a safe lane return.

A relatively low probability of a safe lane return can be compensated by taking into account an increased safe lane return distance required for a safe lane return. In other words, in case of an increased traffic, the system desirably requires a longer available passage on the overtaking lane, in order to enable the autonomous overtaking functionality.

Figure 8:
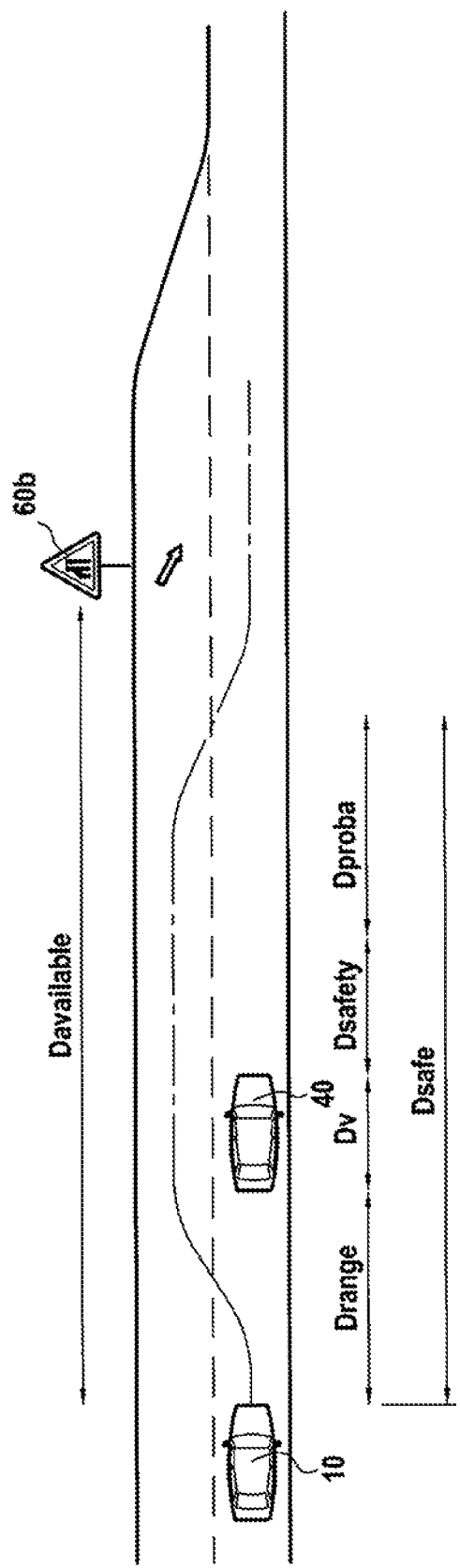
FIG. 8 shows a schematic representation of a diagram of a scenario, where the overtaking function is enabled according to embodiments of the present disclosure.

FIG. 8 shows a schematic representation of a diagram of a scenario, where the overtaking function is enabled according to embodiments of the present disclosure. In this example the system 30 of the (host) vehicle 10 has determined that overtaking of another vehicle 40 in front becomes required or is suitable (e.g. due to a significant predetermined speed difference between vehicles 10 and 40). It has further been determined that the overtaking lane is a hazardous lane as it comprises an overtaking lane end due to a lane merging in a predetermined distance $D_{available}$ detected e.g. by detecting the corresponding traffic sign 60b). Said distance $D_{available}$ constitutes at the same time the estimated distance available for the overtaking. Since the estimated distance available for the overtaking is limited, the system calculates the estimated distance required for safe overtaking $D_{safe}$. In the example of FIG. 8, the estimated distance required for safe overtaking $D_{safe}$ on the overtaking lane does not exceed the estimated distance available for the overtaking $D_{available}$. Thus the autonomous overtaking functionality is not disabled and an overtaking may be initiated.

Using the relative motion of the vehicle with regard to the vehicle 40, and the probability of a safe lane return P, the distance required for safe overtaking $D_{safe}$ may be estimated. The probability P is desirably used to alter the safe lane return distance $D_{proba}$ (based on relative speed between own vehicle and overtaking target, and desirable the own vehicle acceleration capability).

In particular the distance required for safe overtaking $D_{safe}$ may be calculated as:

$$D_{safe} = (D_{range} + D_{safety} + D_{proba}) * V/(V - V_{lead})$$

wherein $D_{range}$ = measured range to target (the vehicle 40 to be overtaken) + vehicle length $D_v$, e.g. an estimated average parameter (e.g. 6 m), $D_{safety}$ is a time headway (constant eg. 2 sec)×V (in case of e.g. V=30 m/s, $D_{safety}$ may be 30 m/s*2 sec=60 m), $D_{proba}$ is the additional distance necessary for traffic insertion, calculated as a function of the probability P of safe lane return, V is vehicle speed of the vehicle 10, and $V_{lead}$ is the estimated leading vehicle speed (i.e. of vehicle 40), e.g. detected by forward sensor measurement.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An automated driving system for a vehicle comprising:
   at least one sensor device configured to detect a vehicle position of the vehicle and sense environment characteristics of the vehicle, and
   an electronic control device configured to:
   control autonomous driving of the vehicle based on an output of the sensor device, wherein said controlling of autonomous driving includes an autonomous overtaking functionality for overtaking by changing the lane,
   determine an overtaking lane end based on at least one of a detected road sign and the detected vehicle position of the vehicle in combination with map information, wherein said overtaking lane end includes at least one of a lane merging area and an exit lane,
   estimate a required safe distance to complete overtaking as a function of the determined overtaking lane end, and
   disable the autonomous overtaking functionality, in case at least one of a set of predetermined overtaking conditions is not satisfied.

2. The automated driving system according to claim 1, wherein
   the set of predetermined overtaking conditions comprises at least one of:
   a condition, where at least one of a current lane on which the vehicle moves and a parallel overtaking lane has a traffic density not exceeding a predetermined traffic density threshold,
   a condition, where an estimated probability of a safe lane return from the overtaking lane to the current lane for completing the overtaking is equal to or higher than a predetermined safe lane return threshold, and
   a condition, where the estimated distance required for safe overtaking on the overtaking lane does not exceed an estimated distance available for the overtaking.

3. The automated driving system according to claim 2, wherein
   the probability of the safe lane return is determined based on at least one of a predetermined look-up table and a predetermined mathematical model representing an average traffic at the position of the vehicle.

4. The automated driving system according to claim 2, wherein the electronic control device is configured to determine the traffic density based on at least one of external traffic information and sensor output of a predetermined time period.

5. The automated driving system according to claim 4, wherein
determining the traffic density includes determining a vehicle mean distance between other vehicles on at least one of the lane driven by the vehicle and a neighbor lane in a predetermined range around the vehicle.

6. The automated driving system according to claim 2, wherein
the look-up table comprises predetermined information about a safe lane return probability as a function of at least one of the traffic density and the vehicle mean distance.

7. The automated driving system according to claim 2, wherein
the probability of the safe lane return is determined by looking up in the look-up table the safe lane probability matching to at least one of the determined traffic density and the vehicle mean distance.

8. The automated driving system according to claim 2, wherein
the electronic control device is configured to determine the distance required for safe overtaking as a function of at least one of a relative speed of the vehicle with respect to another vehicle in front to be overtaken, the estimated probability of a safe lane return, the distance between the vehicle and the other vehicle, and a predetermined speed-dependent safety distance.

9. The automated driving system according to claim 8, wherein
the predetermined speed-dependent safety distance is determined as a function of the vehicle speed and a predetermined time constant.

10. The automated driving system according to claim 2, wherein
the distance required for safe overtaking is further determined as a function of a safe lane return distance required for a safe lane return, said safe lane return distance being determined as a function of the probability of a safe lane return, with the safe lane return distance increasing when the probability of a safe lane return decreases.

11. The automated driving system according to claim 2, wherein
the electronic control device is configured to estimate the distance available for the overtaking as the distance between the vehicle and the detected overtaking lane end, the vehicle being autonomously driven toward the detected overtaking lane end.

12. The automated driving system according to claim 1, wherein
in case the vehicle is autonomously driven toward the overtaking lane end,
the set of predetermined overtaking conditions further comprises a condition, where said overtaking lane end is beyond a predetermined distance.

13. The automated driving system according to claim 1, wherein
the electronic control device comprises an object classification functionality for detecting and classifying external objects including other vehicles and road signs, wherein
the object classification is based on at least one of a camera sensor output of the sensor device, a radar sensor output of the sensor device, and a LIDAR sensor output of the sensor device.

14. The automated driving system according to claim 1, wherein
disabling the autonomous overtaking functionality includes at least one of blocking an overtaking manoeuver and
stopping an overtaking manoeuver, in case the vehicle has started overtaking for less than a predetermined time period.

15. The automated driving system according to claim 1, wherein
the sensor device comprises at least one of a radar sensor, a camera sensor, a LIDAR sensor, and a radio navigation sensor.

16. The automated driving system according to claim 1, wherein
the system further comprises a radio interface for receiving data comprising at least one of external traffic information and map data.

17. A vehicle comprising an automated driving system according to claim 1.

18. A method of autonomously driving a vehicle having an automated driving system, the method comprising:
detecting a vehicle position of the vehicle,
sensing characteristics of the environment of the vehicle,
controlling autonomous driving of the vehicle based on at least one of the sensed characteristics and the detected vehicle position, wherein said controlling of autonomous driving includes an autonomous overtaking functionality for overtaking by changing the lane,
determining an overtaking lane end based on at least one of a detected road sign and the detected vehicle position of the vehicle in combination with map information, wherein said overtaking lane end includes at least one of a lane merging area and an exit lane,
estimating a required safe distance to complete overtaking as a function of the determined overtaking lane end, and
disabling the autonomous overtaking functionality, in case at least one of a set of predetermined overtaking conditions is not satisfied.

* * * * *